United States Patent
Liu et al.

(10) Patent No.: US 10,762,699 B2
(45) Date of Patent: Sep. 1, 2020

(54) MACHINING PARAMETER AUTOMATIC GENERATION SYSTEM

(71) Applicant: INDUSTRIAL TECHNOLOGY RESEARCH INSTITUTE, Hsinchu (TW)

(72) Inventors: Yang-Lun Liu, New Taipei (TW); Yu-Lin Tsai, Taoyuan (TW); Yao-Yang Tsai, Taipei (TW); Cheng-Chieh Wu, Yuanlin (TW); Shuo-Peng Liang, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 16/225,931

(22) Filed: Dec. 19, 2018

(65) Prior Publication Data
US 2020/0184720 A1 Jun. 11, 2020

(30) Foreign Application Priority Data
Dec. 5, 2018 (TW) .............................. 107143557 A

(51) Int. Cl.
*G06T 17/10* (2006.01)
*G06K 9/62* (2006.01)
(Continued)

(52) U.S. Cl.
CPC .............. *G06T 17/10* (2013.01); *G06F 30/00* (2020.01); *G06K 9/6232* (2013.01); *G06K 9/6256* (2013.01); *G06N 3/08* (2013.01)

(58) Field of Classification Search
CPC ....... G06T 17/10; G06F 30/00; G06K 9/6232; G06K 9/6256; G06N 3/08
See application file for complete search history.

(56) References Cited

U.S. PATENT DOCUMENTS 3,872,756 A * 3/1975 Pearson ............... B23D 35/005
83/522.23
6,363,298 B1 3/2002 Shin et al.
(Continued)

FOREIGN PATENT DOCUMENTS

| CN | 101817163 A | 9/2010 |
| CN | 102289537 A | 12/2011 |

(Continued)

OTHER PUBLICATIONS

Taiwanese Office Action and Search Report dated Aug. 26, 2019, for corresponding Taiwanese Application No. 107143557.
(Continued)

*Primary Examiner* — Grace Q Li
(74) *Attorney, Agent, or Firm* — Birch, Stewart, Kolasch & Birch, LLP

(57) ABSTRACT

A machining parameter automatic generation system includes a geometric data capturing module, a feature recognition learning network and a machining parameter learning network. The geometric data capturing module captures a geometric shape of a workpiece to generate a candidate feature list. The feature recognition learning network trains the candidate feature list according to a first neural network model to obtain an applicable feature list. The machining parameter learning network trains the applicable feature list and the candidate machining parameter according to a second neural network model to obtain an applicable machining parameter. The applicable machining parameter is used to generate a machining program, and the machining program is read by a machine tool for processing.

4 Claims, 1 Drawing Sheet

(51) Int. Cl.
*G06N 3/08* (2006.01)
*G06F 30/00* (2020.01)

(56) References Cited

U.S. PATENT DOCUMENTS

| | | | |
|---|---|---|---|
| 7,643,027 B2 | 1/2010 | Rothstein et al. | |
| 7,933,679 B1* | 4/2011 | Kulkarni | G05B 13/0265 |
| | | | 700/173 |
| 8,150,545 B2* | 4/2012 | Jahn | G05B 19/404 |
| | | | 700/159 |
| 9,886,529 B2 | 2/2018 | Kannan et al. | |
| 2016/0075028 A1* | 3/2016 | Bain | B25J 9/1684 |
| | | | 700/110 |
| 2017/0090459 A1 | 3/2017 | Koga | |
| 2019/0152054 A1* | 5/2019 | Ishikawa | B25J 15/08 |
| 2019/0258925 A1* | 8/2019 | Li | G06N 3/08 |

FOREIGN PATENT DOCUMENTS

| | | |
|---|---|---|
| CN | 108115232 A | 6/2018 |
| TW | 201518887 A | 5/2015 |
| TW | I518469 B | 1/2016 |

OTHER PUBLICATIONS

Joshi et al., "Graph-based heuristics for recognition of machined features from a 3D solid model", Computer-Aided Design, vol. 20, No. 2, Mar. 1988, pp. 58-66.
Kuss et al., "Manufacturing task description for robotic welding and automatic feature recognition on product CAD models", Elsevier, Procedia CIRP, vol. 60, 2017, pp. 122-127.
Lau et al., "Development of a computer-integrated system to support CAD to CAPP", Int J Adv Manuf Technol, vol. 26, Issue 9-10, 2005, pp. 1032-1042.
Subrahmanyam et al., "An overview of automatic feature recognition techniques for computer-aided process planning", Elsevier, Computers in Industry, vol. 26, 1995, pp. 1-21.
Sunil et al., "Automatic recognition of features from freeform surface CAD models", Elsevier, Computer-Aided Design, vol. 40, Issue 4, 2008, pp. 502-517.

* cited by examiner

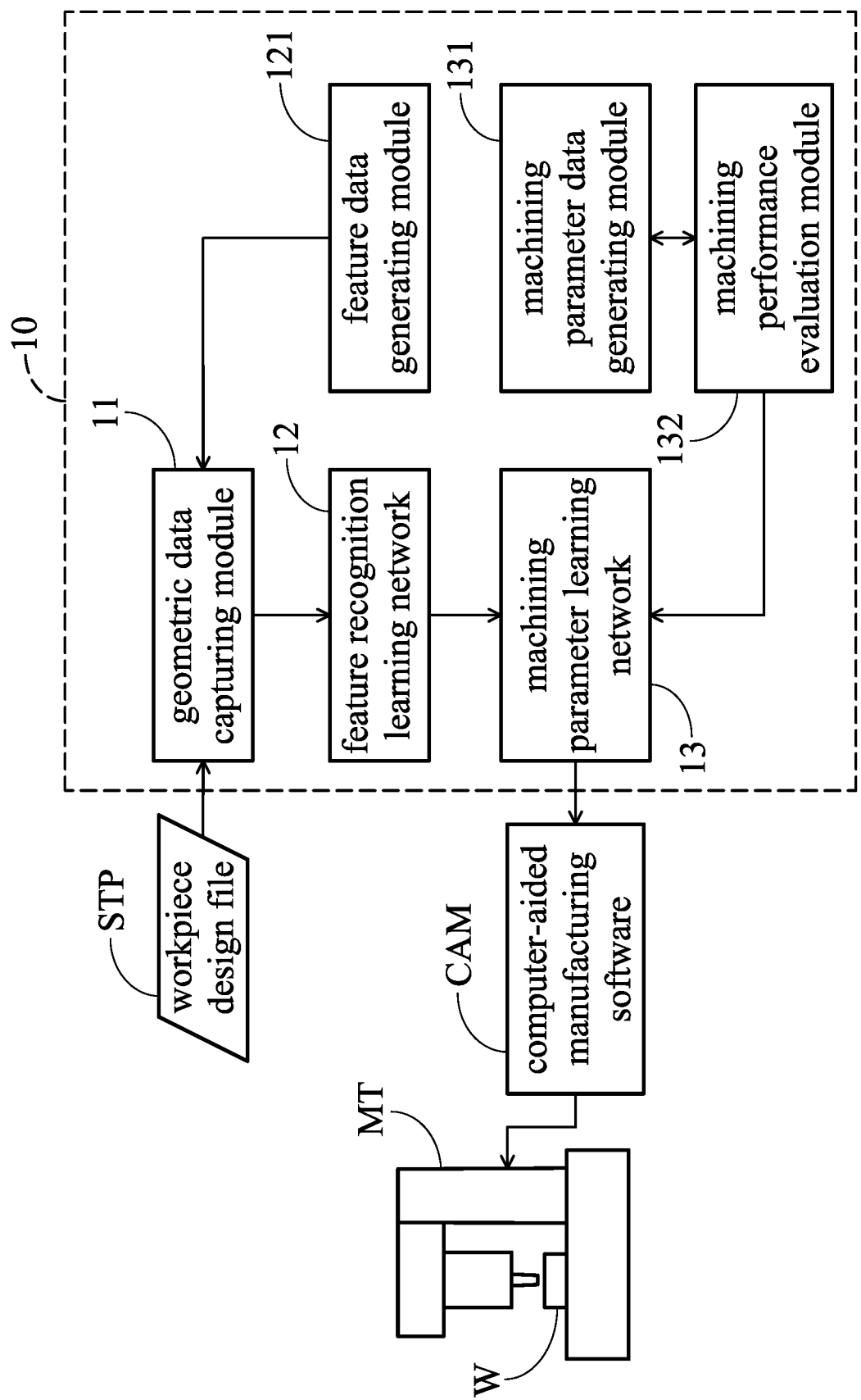

MACHINING PARAMETER AUTOMATIC GENERATION SYSTEM

CROSS-REFERENCE TO RELATED APPLICATION

The present application is based on, and claims priority from, Taiwan Application Serial Number 107143557, filed Dec. 5, 2018, the disclosure of which is hereby incorporated by reference herein.

TECHNICAL FIELD

The present disclosure relates to an automatic generation system, and in particular it relates to a machining parameter automatic generation system for performing a machining program of a machine tool.

BACKGROUND

Most existing machining programs are compiled by engineers using software such as computer-aided design and computer-aided manufacturing (CAD/CAM) for tool path planning. However, various machining parameters, such as speed, feed, depth of cut, etc., must be based on experience or reference data, and then multiple trials are needed to obtain more appropriate parameters. It takes a lot of time and costs a lot of money to process workpieces with complex geometric shapes or new materials.

SUMMARY

In view of the information above, the present disclosure provides an automatic processing parameter generation system, which combines the feature recognition of the machine learning method. From the existing machining information and artificially generated data, related data is extracted. The related data is input into the machine learning model for training, and a model for selecting appropriate machining parameters is obtained to improve machining planning and machining efficiency, which may effectively improve the aforementioned issues with time and cost.

An machining parameter automatic generation system according to the present disclosure includes: a geometric data capturing module that captures a geometric shape of a workpiece to generate a candidate feature list; a feature recognition learning network that trains a candidate feature list according to a neural network model to obtain a applicable features list; and a machining parameter learning network. The applicable feature list and candidate machining parameters are trained according to another neural network model to obtain optimized applicable machining parameters.

It should be understood that both the foregoing general description and the following detailed description are exemplary only, and are intended to provide further explanation of the disclosure as claimed.

BRIEF DESCRIPTION OF THE DRAWINGS

FIG. 1 is a schematic diagram of a machining parameter automatic generation system in accordance with one embodiment of the present disclosure.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

FIG. 1 is a schematic diagram of a machining parameter automatic generation system 10 in accordance with one embodiment of the present disclosure. The machining parameter automatic generation system 10 of the present disclosure is used to generate a machining parameter of a machining program, hereinafter referred to as the generation system 10. The generation system 10 can be composed and implemented by software or hardware, and it is not limited thereto. For example, the generation system 10 mainly includes a geometric data capturing module 11 (hereinafter referred to as a capturing module 11), a feature recognition learning network 12 (hereinafter referred to as a feature network 12), and a machining parameter learning network 13 (hereinafter referred to as a parameter network 13). The generation system 10 can receive a three-dimensional design image file STP of the workpiece W, such as a STEP image file. The three-dimensional design image file STP of the workpiece W is transmitted from an external device. After processing the three-dimensional design file STP of the workpiece W, an optimized applicable machining parameter, such as tool, feed, depth of cut, etc., is transmitted to the external or internal computer-aided manufacturing software CAM to generate a machining program including the tool path. Finally, the machining program is read by the machine tool MT to process the workpiece W.

Please refer to FIG. 1. After the capturing module 11 of the generation system 10 receives the three-dimensional design image file STP of the workpiece W, the design image file STP can represent the complete geometric shape of the workpiece W, the geometric shape of the workpiece W is composed of multiple of features such as planes, rounded corners, chamfers, grooves, holes, etc., the capturing module 11 of the generation system 10 extracts each feature and output a candidate feature list. For example, the candidate feature list can represent the number, type, position and the like of each feature. In a training process, the capturing module 11 can also selectively receive a majority of the training features transmitted by the feature data generating module 121 (hereinafter referred to as the feature module 121) and output a training feature list. The training features are generated by the feature module 121 in a random or random manner. The capturing module 11 re-inputs the two lists (candidate feature list, training feature list) into the neural network model of the feature network 12 for training to finally determine an applicable feature list. The machining parameter automatic generation system 10 establishes and trains a model by machine learning. In addition, the machining parameter automatic generation system 10 significantly improves the accuracy of feature extraction. Once the model is fully trained, that is, in the application stage, the capturing module 11 can no longer receive a list of training features. The feature network 12 described above is referred to as a network, but the feature network 12 is actually a calculation module, though it is not limited thereto.

After an applicable feature list is determined, in a training process, the machining parameter data generating module 131 (hereinafter referred to as the parameter module 131) simultaneously generates a machining parameter of an initial version according to the design image file STP. The machining parameter can be, such as a tool, a method, a rotation speed, a feed and/or other materials. The machining parameter of the initial version is then transferred to the machining performance evaluation module 132 (hereinafter referred to as the evaluation module 132). The machining parameter is evaluated by virtual processing to generate the processing time, cutting force, etc. that corresponds to the above parameter data. The result may not meet the processing requirements, such as long processing time or excessive cutting force. Thus, it will be returned to the parameter module 131 for re-generation and evaluation until it finally meets the requirements. The machining parameter of current version is then passed to the parameter network 13.

After receiving the candidate machining parameters, the parameter network 13 performs learning training with another neural network model along with the applicable feature list to finally determine or select a modified or optimized applicable machining parameter. Although the aforementioned parameter network 13 is called a network, it is actually a calculation module, though it is not limited thereto.

When an applicable machining parameter is finally determined, the automatic generation of the machining parameters of the generation system 10 is completed. The entire process does not require intervention or adjustment by the engineer. For example, the applicable machining parameter for this version will be transmitted to the external or internal computer-aided manufacturing software CAM of the generation system 10 to generate a machining program that includes a tool path. The machining program is finally read by the machine tool MT for processing.

The machining parameter automatic generation system can finally determine an applicable machining parameter from the design drawing file of the workpiece. The machining parameter automatic generation system can also generate the machining program indirectly or directly, by automatically generating and extracting features, generating machining parameters, and evaluating machining efficiency. The machining parameter automatic generation system has changed the way of relying on engineer. The machining parameter automatic generation system not only saves time and cost, but also the degree of accuracy and optimization will be perfected with learning and training. It has the conditions for patentability.

Although the disclosure has been illustrated and described with respect to one or more implementations, equivalent alterations and modifications will occur or be known to others skilled in the art upon the reading and understanding of this specification and the annexed drawings. In addition, while a particular feature of the disclosure may have been disclosed with respect to only one of several implementations, such a feature may be combined with one or more other features of the other implementations as may be desired and advantageous for any given or particular application.

What is claimed is:

1. A machining parameter automatic generation system, comprising:
   a geometric data capturing circuit, configured to capture a geometric shape of a workpiece to generate a candidate feature list;
   a feature recognition learning network circuit, configured to train the candidate feature list according to a first neural network model to obtain an applicable feature list;
   a machining parameter learning network circuit, configured to train the applicable feature list and a candidate machining parameter according to a second neural network model to obtain an applicable machining parameter;
   a feature data generating circuit, configured to generate a plurality of training features for the geometric data capturing circuit to generate a training feature list, wherein the feature recognition learning network circuit further trains the training feature list to obtain the applicable feature list; and
   a machining parameter data generating circuit, configured to generate the candidate machining parameter according to the geometric shape,
   wherein the applicable machining parameter is used to generate a machining program, and the machining program is read by a machine tool for processing machining.

2. The machining parameter automatic generation system of claim 1, wherein the geometric shape refers to a three-dimensional design image of the workpiece and the geometric shape includes a plurality of features.

3. The machining parameter automatic generation system of claim 1, further comprising:
   a machining performance evaluation circuit, configured to evaluate the candidate machining parameter using a virtual machining method.

4. The machining parameter automatic generation system of claim 1, further comprising:
   a processor, configured to execute computer-aided manufacturing software, wherein the computer-aided manufacturing software generates the machining program including a tool path according to the applicable machining parameter.

* * * * *